No. 687,692. Patented Nov. 26, 1901.
C. LINDSTRÖM.
REINFORCING DEVICE FOR SEMI-ELLIPTIC SPRINGS.
(Application filed July 22, 1901.)
(No Model.)
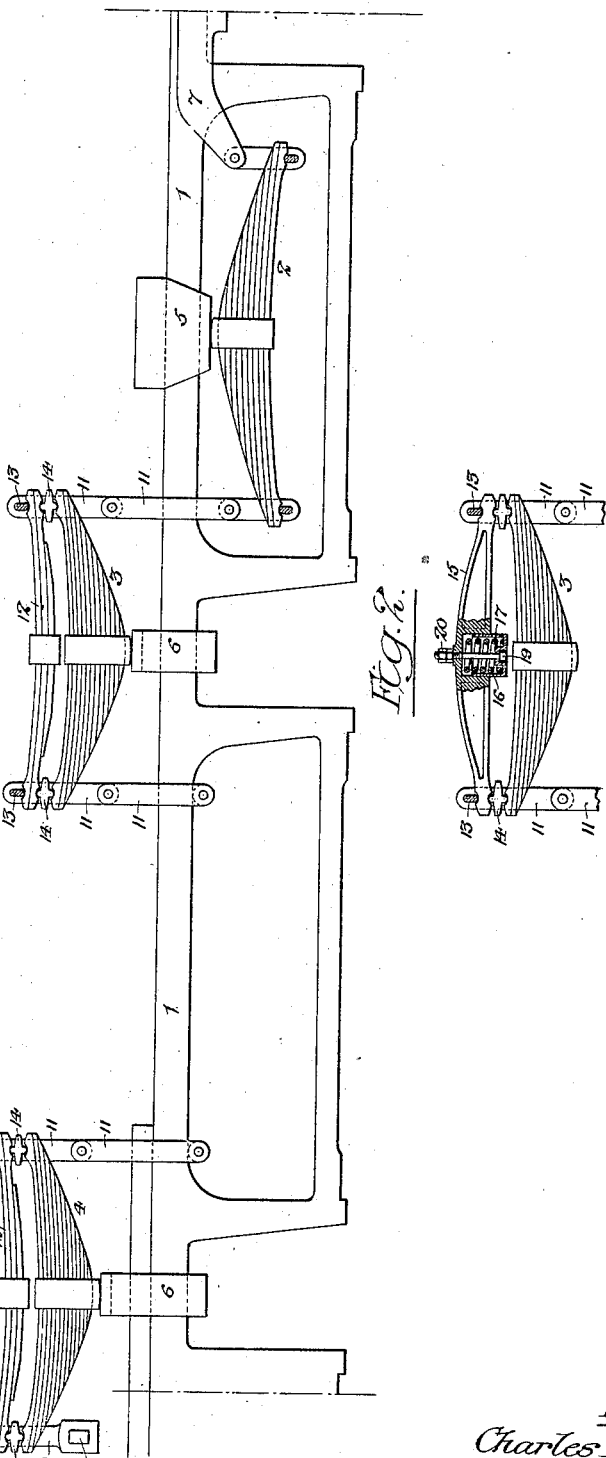

UNITED STATES PATENT OFFICE.

CHARLES LINDSTRÖM, OF BLOOMINGTON, ILLINOIS, ASSIGNOR OF ONE-HALF TO CLARENCE M. MENDENHALL, OF BLOOMINGTON, ILLINOIS.

REINFORCING DEVICE FOR SEMI-ELLIPTIC SPRINGS.

SPECIFICATION forming part of Letters Patent No. 687,692, dated November 26, 1901.

Application filed July 22, 1901. Serial No. 69,265. (No model.)

*To all whom it may concern:*

Be it known that I, CHARLES LINDSTRÖM, a citizen of the United States, and a resident of Bloomington, Illinois, have invented certain Improvements in Reinforcing Devices for Semi-Elliptic Springs, of which the following is a specification.

The object of my invention is to provide an effective method of reinforcing semi-elliptic springs, so as to prevent breakage of the same due to excessive deflection. This object I attain in the manner hereinafter set forth, reference being had to the accompanying drawings, in which—

Figure 1 represents part of the frame and spring structure of a locomotive, illustrating my improved means for reinforcing the semi-elliptic springs of said spring structure; and Fig. 2 is a view of a single spring, illustrating another method of carrying out my invention.

In Fig. 1 of the drawings, 1 represents part of the frame of a locomotive, and 2, 3, and 4 a series of semi-elliptic springs forming part of the spring structure of the engine, the spring 2 having its bearing upon a block 5 on the frame 1 and the springs 3 and 4 bearing upon yokes 6, which in the engine are interposed between said springs and the journal-boxes of the center and rear driving-axles. The forward spring 2 is connected at its forward end to a lever 7, which in practice bears upon the journal-box of the forward driving-axle, and the rear spring 4 is connected by a yoke 9 to the transverse equalizing-lever 10. The front end of the rear spring 4 is connected by links 11 to the frame 1, and there is a similar connection between the said frame and the rear end of the central spring 3 and between the forward end of said spring and the rear end of the forward spring 2. The springs are generally designed to have a certain fiber stress under a given static load, this fiber stress being usually about seventy per cent. of the maximum stress to which steel can be subjected without producing permanent set or causing fracture. Semi-elliptic springs, however, used on railroad-cars, locomotives, or other vehicles may because of the roughness of the road be caused to deflect beyond the safe stress, and breakage of such springs in consequence frequently results. With the view of overcoming this objection I introduce a yielding stop, which will assist the effort of the springs to sustain the load after said springs have been deflected to a certain extent and will thus prevent the springs from being deflected beyond safe limits. In Fig. 1 such auxiliary stop is shown in connection with the springs 3 and 4 and consists simply of a supplementary semi-elliptic spring 12, the ends of which have their bearings upon the cross-keys 13 of the links 11 or yoke 9, which would normally constitute the bearings for the ends of the springs 3 or 4, blocks 14 being interposed between the ends of the springs 3 and 4 and the ends of the supplementary springs 12, so as to properly separate the two, permit a certain amount of deflection of the main springs before the supplementary springs come into play, and insure the maintenance of the contact-points at the centers of the hangers. The blocks 14 have centrally-rounded lugs and taper downwardly from these lugs toward the outer edges of the blocks, so that they offer no obstacle to the free deflection of either spring.

In that form of my invention shown in Fig. 2 the supplementary springs 12 are replaced by a rigid bar 15, mounted in the same manner as said supplementary springs, but carrying a central helical spring 16, contained within a central recess of the bar 15 and provided with a cup-like cap 17, which has a central bolt 19 passing through a bar 15 and provided with nuts 20, whereby the adjustment of the cap is permitted and the graduation of the spring 16 thereby provided for.

I am aware that it has been proposed to combine both elliptical and helical springs with supplementary springs for assisting the main spring when the same has been deflected to a certain extent, and I therefore do not broadly claim such combination. I am not aware, however, of any previous construction in which a semi-elliptic spring has been combined with a supplementary spring carried by end bearings or by the same bearings as the main spring and therefore available for use in cases where there is no rigid element of the spring-carrying structure between which and the central portion of the semi-elliptic spring the secondary or supplementary spring could be interposed.

Having thus described my invention, I claim and desire to secure by Letters Patent—

1. The combination of a semi-elliptic spring and a supplementary spring structure both carried by end bearings and so disposed with respect to each other that they are free from contact at the center when the spring is not under compression, but in contact when said main spring is compressed, substantially as described.

2. The combination of a semi-elliptic spring with a supplementary spring structure carried by the same bearings as the main spring, said main and supplementary springs being so disposed with respect to each other that they are free from contact at the center when the spring is not under compression, but in contact when said main spring is compressed, substantially as specified.

3. The combination of a semi-elliptic spring with a supplementary spring structure, bearings common to the ends of the main spring and supplementary spring structure and separating-blocks interposed between the ends of said main spring and the ends of the supplementary spring structure, substantially as specified.

4. The combination of a semi-elliptic spring with a supplementary spring structure, bearings common to the ends of the main spring and supplementary spring structure and separating-blocks interposed between the ends of said main spring and the ends of the supplementary spring structure, and tapered or beveled to permit deflection of the spring or springs, substantially as specified.

5. The combination of a semi-elliptic spring, a rigid bar carrying a supplementary spring adapted to contact with said main spring when the latter has been deflected to a certain degree, and bearings at the ends of the said main-spring and supplementary-spring carrying bar, substantially as specified.

6. The combination of a semi-elliptic spring, a rigid bar centrally recessed for the reception of a helical spring supplementary to the main spring, a cap for said helical spring, a retaining-bolt therefor mounted on the bar, and bearings at the ends of the said main-spring and supplementary-spring carrying bar, substantially as specified.

In testimony whereof I have signed my name to this specification in the presence of two subscribing witnesses.

CHARLES LINDSTRÖM.

Witnesses:
JNO. FR. JOHNSON,
HARRY J. MAGANN.